(12) United States Patent
Kourogi et al.

(10) Patent No.: US 7,995,801 B2
(45) Date of Patent: Aug. 9, 2011

(54) MOBILE POSITIONING SYSTEM

(75) Inventors: Masakatsu Kourogi, Tsukuba (JP); Takeshi Kurata, Tsukuba (JP); Takashi Okuma, Tsukuba (JP)

(73) Assignee: National Institute of Advanced Industrial Science and Technology, Tokyo (JP)

( * ) Notice: Subject to any disclaimer, the term of this patent is extended or adjusted under 35 U.S.C. 154(b) by 668 days.

(21) Appl. No.: 12/133,056

(22) Filed: Jun. 4, 2008

(65) Prior Publication Data

US 2008/0306689 A1    Dec. 11, 2008

(30) Foreign Application Priority Data

Jun. 8, 2007 (JP) ................. 2007-153076

(51) Int. Cl.
*G06K 9/00* (2006.01)
*G01S 5/14* (2006.01)
(52) U.S. Cl. ........ 382/107; 382/106; 382/181; 382/291; 701/217
(58) Field of Classification Search .................. 382/103, 382/106, 107; 701/208, 210, 214, 216, 209, 701/212, 205; 707/100, 2; 340/988, 990, 340/995; 345/473
See application file for complete search history.

(56) References Cited

U.S. PATENT DOCUMENTS

| | | | | |
|---|---|---|---|---|
| 6,108,603 A | * | 8/2000 | Karunanidhi ............ | 701/208 |
| 6,487,500 B2 | * | 11/2002 | Lemelson et al. ......... | 701/301 |
| 6,856,895 B2 | * | 2/2005 | Hashida ................ | 701/207 |
| 7,797,103 B2 | * | 9/2010 | Ishigami et al. .......... | 701/207 |

FOREIGN PATENT DOCUMENTS

| | | |
|---|---|---|
| JP | 2005-226999 A | 8/2005 |
| JP | 2007-121139 A | 5/2007 |

OTHER PUBLICATIONS

Slides Nos. 19 and 20 together with a copy of the partial English translation thereof.
Hirotsugu Arai et al., "Navigation System", pp. 60-63, Jul. 31, 2001, together with a copy of the partial English translation thereof.
Craig A. Scott, "Improved GPS Positioning for Motor Vehicles Through Map Matching", Sep. 20-23, 1994.
Masakatsu Kourogi, et al., "Personal Positioning Based on Walking Locomotion Analysis with Self-contained Sensors and a Wearable Camera", ISMAR03 in Tokyo, Japan, pp. 102-112 (2003).
Yasuaki Ohtaki et al., "Estimation of Amburatory Activity Utilizing Portable Instruments" (Jun. 29, 2005) together with a copy of the partial English translation thereof.
Yusuke Konishi et al., "Development of Pedestrian Positioning System by Autonomous Navigation", pp. 389-392 (2001), together with a copy of the partial English translation thereof.

* cited by examiner

*Primary Examiner* — Daniel G Mariam
*Assistant Examiner* — Nancy Bitar
(74) *Attorney, Agent, or Firm* — Young Basile

(57) ABSTRACT

There is provided a mobile positioning apparatus for performing map matching based on a pixel image. The mobile positioning apparatus comprises a position storage indicating a current position of a mobile body and likelihood information thereof as a nonparametric distribution; a movement vector estimation device which outputs a movement vector indicating a moving distance and a moving direction of the mobile body at a discrete time T and likelihood information thereof; an image database which holds a peripheral map of a range of movement of the mobile body as an image group of a resolution according to a moving resolution of the mobile body; and a pixel crossing determination device which performs map matching using the position information group and a the movement vector based on the peripheral map.

16 Claims, 14 Drawing Sheets

401: MOVEMENT VECTOR OF MOVING WALKWAY

400: POSITION CANDIDATE GROUP ON REGION OF MOVING WALKWAY POSITION IS AUTOMATICALLY MOVED AND UPDATED BASED ON INFORMATION OF IMAGE DATABASE

402: REGION OF MOVING WALKWAY

POSITION CANDIDATE GROUP REMOVED BY REGION CROSSING DETERMINATION

IF MAJORITY OF CANDIDATE GROUP IS REMOVED,
ANGLE BETWEEN STRAIGHT LINE AND MOVEMENT VECTOR IS FED BACK AS ERROR OF MOVING DIRECTION OF DEAD RECKONING DEVICE

MOBILE POSITIONING SYSTEM

BACKGROUND OF THE INVENTION

1. Field of the Invention

The present invention relates to a mobile positioning apparatus capable of accurately positioning a current position of a mobile body, for example, in a building where a GPS (global positioning system) cannot be used.

2. Description of the Related Art

In a navigation field, where a GPS is mainly used, a technique for covering a positioning error using map matching in a case where the GPS cannot be used has been proposed mainly as an application of a car navigation system.

Most of the map matching techniques use moving path network information which treats a crossing point as a node and a moving path as a straight line, and which is used as map information to perform map matching to cover a positioning error as disclosed in Patent Documents 1 to 4 and Non-Patent Documents 1, 2, 3, and 5 as described later.

Therefore, the conventional map matching techniques work correctly in an orderly environment such as one including straight lines and corners. However, for example, in an indoor environment having a complicated structure, it is difficult and impractical to create map information such as a road network, and thus a map matching techniques cannot be used effectively.

In addition, the movement of a human as a mobile body is smaller than a car, and the moving direction thereof changes finely. Therefore, a map matching technique based on a simple linear matching is not adequate for a human positioning purpose. For example, according to the pedestrian positioning system disclosed in Non-Patent Document 6 described later, a collision determination with respect to the movement vector is performed on a path network with some width, and a handling method of a collision corrects the collision point to an edge of the path network.

When a positioning apparatus for navigating a mobile body is implemented, a dead reckoning device for cumulatively estimating the movement vector of the mobile body has a problem in that errors are cumulatively accumulated with the passage of time.

In view of this, the positioning apparatus based on the dead reckoning device needs to provide correction information about a position to improve the positioning accuracy. As means for providing such correction information, for example, there is provided a method for using position correction means relying on an external artificial environment. An example of this method includes correction means for correcting the position by embedding a radio frequency identification (RFID) tag in the environment and detecting this tag. Such correction means has a problem in that a need for working over the external environment increases a deployment cost for putting the use environment in place.

Patent Document 1: JP-A-2005-226999;
Patent Document 2: JP-A-2007-121139;
Patent Document 3: U.S. Pat. No. 6,856,895;
Patent Document 4: U.S. Pat. No. 6,108,603;
Non-Patent Document 1: Slides No. 19 and No. 20 at http://www.fpoir.org/OPEN/FORUM11_DRkonishi_040820.pdf;
Non-Patent Document 2: "Navigation System" written by Arai and Washino, issued by Sankaido, pp. 60-63;
Non-Patent Document 3: http://www.novatel.com/Documents/Papers/File37.pdf;
Non-Patent Document 4: "Personal positioning based on walking locomotion analysis with self-contained sensors and a wearable camera," Masakatsu Kourogi, Takeshi Kurata, Proceedings of International Symposium on Mixed and Augmented Reality (ISMAR2003), pp. 103-112, 2003;
Non-Patent Document 5: "Estimation of Ambulatory Activity Utilizing Portable Instruments" The society of Instrument and Control Engineers, Tohoku Chapter, 222nd (Jun. 29, 2005), Document No. 222-10; and
Non-Patent Document 6: "Development of Pedestrian Positioning System by Autonomous Navigation", Papers and Proceedings of the Geographic Information Systems Associations", Vol. 10, pp. 389-392, 2001.

SUMMARY OF THE INVENTION

An object of the present invention is to provide a mobile positioning apparatus provided with correction means capable of removing an accumulated error of a dead reckoning device by using autonomous means without using an external artificial environment. More specifically, the object of the present invention is to provide a mobile positioning apparatus for performing map matching based on a pixel image.

In order to achieve the above object, the present invention employs the basic concept of taking an approach to holding a map database about an external environment as autonomous position correction means. In an artificial environment where a map matching method can be used, a map is expected to be in place. Therefore, it is practical to put and use such a map database in a computer resource. In particular, it is highly probable to be able to obtain map data inside a building, since CAD data or a guide map inside the building has been created when the building was built.

According to the present invention, in order to perform map matching, map information around a mobile body is held as a pixel image. This pixel image is used by assigning a different pixel value to a region allowing movement and passage and to a region having difficulty for movement and passage. For example, when such a map image is expressed with an 8 bit gray scale image, a pixel value of "255" (=white) is assigned to a region where a mobile body can pass; and a pixel value of "0" (=black) is assigned to a region such as a wall and an obstacle through which a mobile body cannot pass; and even if the mobile body can pass, but has some difficulty passing or tends to avoid passing the region, a pixel value close to 0 is assigned to the region depending on the difficulty. An example of the pixel image used for map matching is shown in FIG. 5 as described later.

Here, a pixel image for map matching is accumulated in an image database, but the accumulated image is not always limited to the pixel image. Any original data of the map image which can be finally converted to a pixel value according to the position may be used. For example, even if image data stored in a non-pixel image format (vector format), such as scalable vector graphics (SVG), it may be used since a pixel value of each coordinate (position) can finally be extracted. In fact, the present invention can use image data stored in such a format as image data for map matching.

In addition, according to the present invention, the position of a mobile body is expressed by the position information group of a nonparametric distribution, and the likelihood information of the position after movement generated by a movement vector is updated based on the movement vector outputted by the movement vector estimation device and the likelihood information thereof. In this process, a pixel image where the movement vector passes is considered and a position candidate generated after movement is generated. The current position is updated for each process by appropriately generating the distribution of a position after movement.

Here, the position information representing the mobile position is held as nonparametric distribution data. However, another configuration may be implemented such that the distribution information is held and updated by a particle filter, as another example of holding data.

According to the mobile positioning apparatus of the present invention, a position information group of a nonparametric distribution is used to express the current position of the mobile body, but the mobile position may be expressed by a parametric distribution instead. For example, the position may be expressed by a Gaussian Mixture Model (GMM) adding a plurality of Gaussian distributions. In this case, the position distribution of a mobile body can be expressed by a weight for each Gaussian distribution, an average vector thereof, and a variance-covariance matrix. As a method of expressing a further complicated distribution, a combination of the Gaussian Mixture Mode with a finite number of mask regions can be used to express the final distribution. Here, the mask region refers to a region having a uniform, constant value (e.g., "0") of height of a distribution in the region.

More specifically, according to an aspect of the present invention, the mobile positioning apparatus in accordance with the present invention comprises a position storage device which holds a position information group indicating a current position of a mobile body and likelihood information thereof as a nonparametric distribution; a movement vector estimation device which outputs a movement vector indicating a moving distance and a moving direction of the mobile body at a discrete time T and likelihood information thereof; an image database which holds a peripheral map of a range of movement of the mobile body as an image group of a resolution according to a moving resolution of the mobile body; and a pixel crossing determination device which performs map matching using the position information group and the movement vector based on the peripheral map; wherein the image database accumulates the peripheral map as a pixel image group which has a different pixel value depending on a region where the mobile body can move and the other regions and which has a known correspondence to position information; and the pixel crossing determination device generates a position candidate group at a discrete time T+1 based on a position information group at a discrete time T held by the position storage device, a movement vector outputted by the movement vector estimation device, and likelihood information of the movement vector; performs a pixel crossing determination on each position candidate taken from the position candidate group to determine whether the moving path connecting between a point before movement and a point after movement thereof crosses a pixel inhibiting movement and passage on the image; filters the generated position candidate group and generates the remaining position candidate group; normalizes the result, generates a position information group of a nonparametric distribution of a position at a discrete time T+1, and updates a content of the position storage device. Here, the position candidate group has discrete position information and likelihood information thereof.

In this case, a pixel image in the pixel image group accumulated in the image database is image data which is different in size of pixel value corresponding to the position thereof depending on ease of movement and passage in the region inside the image. Alternatively, the pixel image is image data which has a pixel value which can be converted to a value indicating ease of movement and passage at the position corresponding to each pixel image. The pixel crossing determination device is configured to calculate the crossing determination result according to the size of the pixel value on the moving path and reduce the likelihood of each position candidate group based on the degree of crossing and the size of the pixel value.

In addition, information about a moving speed and a moving direction of a device having an automatically moving function between floors or within a floor is assigned to a region of the map accumulated in the image database corresponding to the device having the automatically moving function between floors or within a floor. When there is a position candidate group in the region containing the device having the moving function, the pixel crossing determination device is configured to generate the position information group by moving the position candidate group by the moving speed and the moving direction thereof.

According to another aspect of the mobile positioning apparatus of the present invention, information about an adjacent state on a plane is assigned to a pixel image in the pixel image group accumulated in the image database. The pixel crossing determination device is configured such that when a movement vector crossing between the accumulated pixel images is inputted by estimation, the pixel crossing determination device obtains pixel data required for crossing determination with respect to the movement vector by selecting from the image database a plurality of pixel image groups including all movable position candidate groups of the movement vector.

According to still another aspect of the mobile positioning apparatus of the present invention, information about an adjacent state in a height direction of the position is assigned to a pixel image in the pixel image group accumulated in the image database. The pixel crossing determination device is configured such that when a movement vector indicating a movement of the mobile body in a vertical direction is generated, the pixel crossing determination device obtains pixel data required for crossing determination with respect to the movement vector by selecting the pixel image groups connected vertically including all movable position candidate groups of the movement vector.

According to another aspect of the mobile positioning apparatus of the present invention, when the pixel crossing determination device performs crossing determination using a movement vector outputted by the movement vector estimation device and finds that there are many candidates crossing a passage-inhibited region continuing in a time series direction on the map showing a continuous straight line path, the crossing determination is configured to use the angle between the straight line path and a majority of movement vectors for error estimation of the moving direction outputted by the movement vector estimation device so as to correct the error outputted by the movement vector estimation device.

According to another aspect of the mobile positioning apparatus of the present invention, in a case of positioning the current position in a movement of a human, the mobile body is a human, and the movement vector estimation device comprises a walking action detection device, a walking stride estimation device, and a moving direction estimation device; the walking action detection device outputs the presence or absence of walking action and the likelihood information thereof; the walking stride estimation device outputs a walking stride and the likelihood information thereof; the moving direction estimation device outputs a moving direction and the likelihood information thereof; and the movement vector estimation device is configured to output a movement vector and the likelihood information thereof based on the presence or absence of walking action and the likelihood information thereof, the walking stride and the likelihood information thereof, and the moving direction and the likelihood information thereof.

According to a method for generating a pixel image used by the mobile positioning apparatus of the present invention, the method is based on a three-dimensional model where ease of movement and passage and the position and the direction thereof are stored as an attribute in a region inside the image. When this three-dimensional model is parallel projected in a direction perpendicular to the ground from above, a bounding box is generated, which is aligned to a coordinate system representing the position and the direction and which is of the smallest size on a plane where the three-dimensional model is projected. The vertex position information for the bounding box is obtained as the position information of the generated pixel image. Then, the three-dimensional model is parallel projected and the pixel image is generated so as to reflect the attributes of ease of movement and passage in the pixel values at projection. The generated pixel image is stored in the image database.

According to the pixel image generation, when the three-dimensional model is parallel projected in a direction perpendicular to the ground from above, in the case of a pixel having an object densely stuffed in the height direction, a method for setting to the pixel value a value indicative of ease or difficulty of movement and passage may be used. For example, if there is an object having a density of N %, a method may be used, for setting the pixel value by the expression: pixel value=255*(100−N)/100.

According to the mobile positioning apparatus of the present invention, the map matching based on a pixel image can remove the position candidate indicating a movement to a region inhibiting movement or difficult to move or can reduce the likelihood thereof. Thereby, it is possible to reduce an error contained in a movement vector outputted by the movement vector estimation device and increase the estimation accuracy of the position of the mobile body. In addition, the position of the mobile body is held as a position information group of a nonparametric distribution. For example, two paths run in parallel as candidates for the mobile body to pass, and the error outputted by the dead reckoning device is too large to uniquely determine which path to be taken. In this case, it is possible to trace the two candidates at the same time by generating a distribution on each of the two paths.

The mobile positioning apparatus of the present invention can provide a positioning device for a navigation system comprising a movement vector estimation device of a mobile body and a map matching device, and a navigation system in indoor and outdoor environments.

DETAILED DESCRIPTION OF PREFERRED EMBODIMENTS

Figure 1:
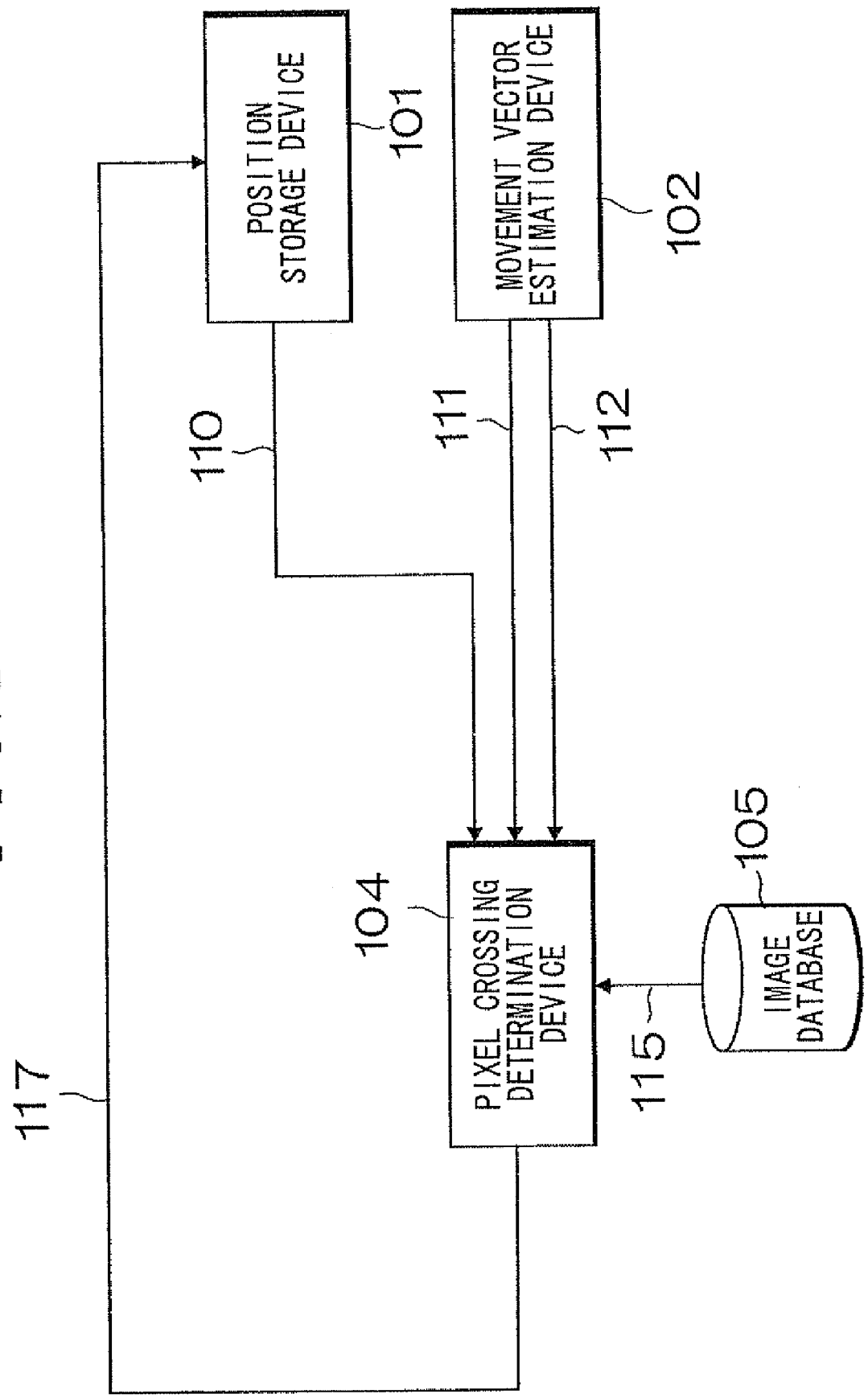
FIG. 1 is a block diagram illustrating a basic configuration of a mobile positioning apparatus in accordance with the present invention.

FIG. 1 is a block diagram illustrating a basic configuration of a mobile positioning apparatus in accordance with the present invention. The block diagram illustrates a flow of processing and a flow of data in the positioning apparatus. With reference to FIG. 1, reference numeral 101 denotes a position storage device; reference numeral 102 denotes a movement vector estimation device; reference numeral 104 denotes a pixel crossing determination device; reference numeral 105 denotes an image database; reference numeral 110 denotes position information group; reference numeral 111 denotes a movement vector information; reference numeral 112 denotes likelihood information; reference numeral 115 denotes image data; and reference numeral 117 denotes pixel crossing determination result data.

The position storage device 101 holds a position information group indicating a current position of a mobile body and the likelihood information thereof as a nonparametric distribution. In other words, the position storage device 101 holds a state indicating the current position of the mobile body by a position information group of a discrete nonparametric distribution and outputs the position information group 110 of the content. A specific data structure of the position information group 110 of a nonparametric distribution estimated as the current position of the mobile body is implemented, for example, such that the position is discretely expressed as a grid state at constant intervals and a numerical value indicating the likelihood is assigned to each discrete position. On the computer, the position information group 110 is implemented by an array structure or a list structure holding the position on each grid and the likelihood information thereof.

The movement vector estimation device 102 is configured, for example, to estimate and output the movement vector information 111 indicating the distance and the direction for a mobile body to move for a specified period of time (sampling time) at a discrete time T and the likelihood information 112 thereof. More specifically, the movement vector estimation device 102 is implemented by a sensor such as a gyro sensor and an acceleration sensor. When the movement vector information 111 is expressed by a normal distribution, the likelihood information 112 of the movement vector information 111 can be parametrically expressed by an error variance-covariance matrix thereof.

In the case of a vehicle, the moving speed and the moving direction of which can be measured, the movement vector can be easily obtained by a sensor. In addition, even in the case where the sensor is assumed to be worn by a human whose moving speed is difficult to directly measure, if a gyro sensor, a geomagnetic sensor, and an acceleration sensor and the like are used as the sensor, the moving direction can be estimated by the gyro sensor or the geomagnetic sensor; and the magnitude of motion can be measured by the acceleration sensor and the moving distance thereof can be estimated. In this case, the likelihood information can be obtained based on an error distribution of the sensing device which exists when the moving distance and the moving direction are measured. In addition, means for obtaining the movement vector is disclosed in Non-Patent Document 4 described above.

The pixel crossing determination device 104 is configured with a data processing device storing a program performing map matching and the like; receives the position information group 110 of a nonparametric distribution about the current position outputted by the position storage device 101 and the movement vector information 111 and the likelihood information 112 outputted by the movement vector estimation device 102 as inputs; and generates the position candidate group (pixel crossing determination result data 117) of an position after movement at a discrete time T+1. The position information group includes information about positions before and after movement, the moving trace thereof, and the likelihood information of the position after movement.

The pixel crossing determination device 104 performs data processing on each position in a discrete distribution held by the position information group of a nonparametric distribution (the position information group 110 of the current position outputted by the position storage device 101), for example, generating the next position candidate group by shifting each position by the movement vector information 111 and by scattering the distribution by considering the likelihood information 112.

The pixel crossing determination device 104 receives the image data 115 covering all the positions in the position candidate group from the image database 105, and performs a determination on each candidate in the position candidate group to see whether or not there is a crossing of a pixel inhibiting movement and passage on the moving path. If there is a region inhibiting movement and passage in the crossing pixel, the pixel crossing determination device 104 lowers the likelihood of the position candidate or deletes the position candidate by treating the likelihood thereof as "0".

Figure 2:
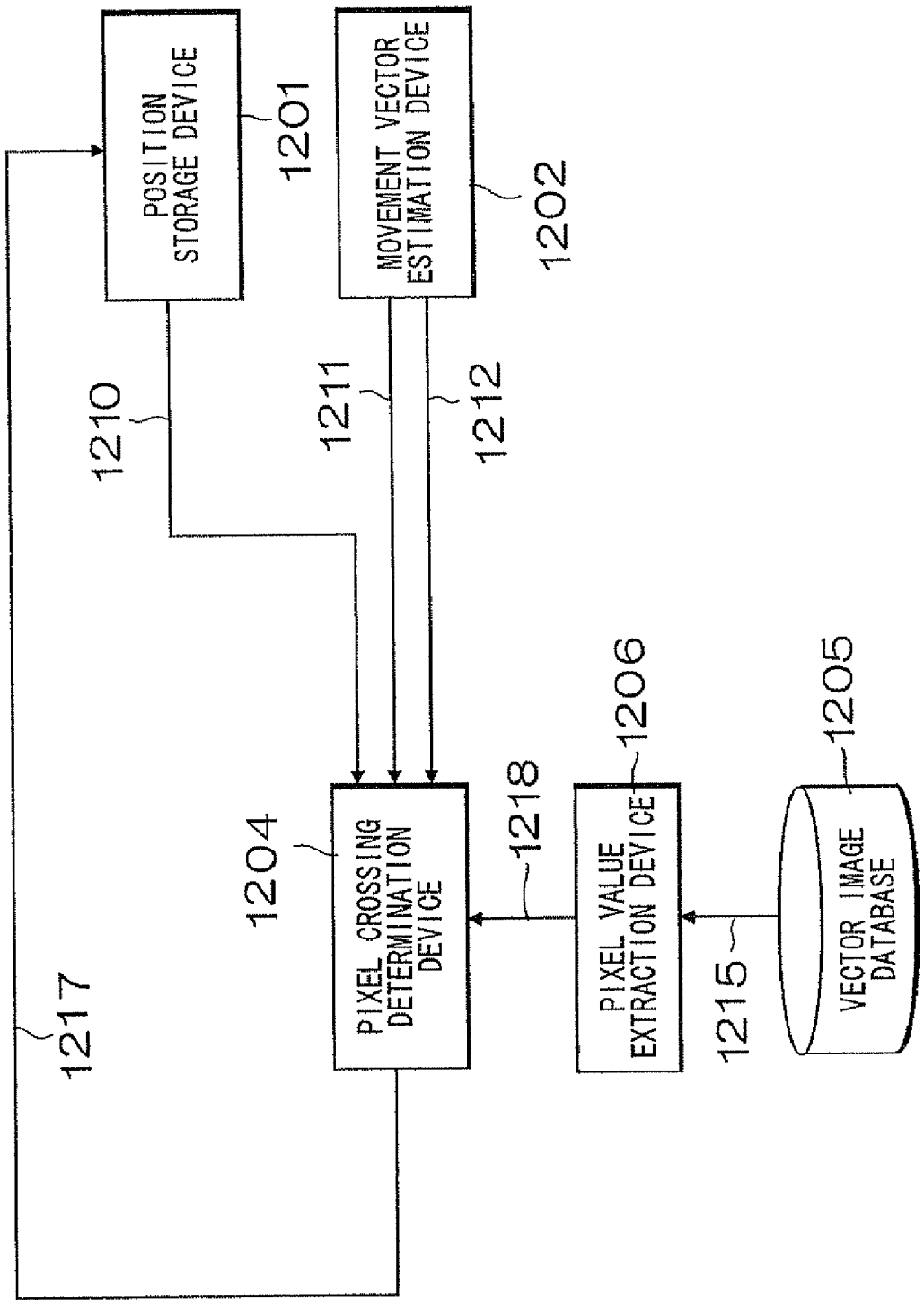
FIG. 2 is a block diagram explaining a configuration of a mobile positioning apparatus in a case where an image database uses vector data such as scalable vector graphics (SVG)

FIG. 2 is a block diagram illustrating a configuration of a mobile positioning apparatus in a case where an image database uses vector data such as scalable vector graphics (SVG). With reference to FIG. 2, reference numeral 1201 denotes a position storage device; reference numeral 1202 denotes a movement vector estimation device; reference numeral 1204 denotes a pixel crossing determination device; reference numeral 1205 denotes a vector image database; reference numeral 1206 denotes a pixel value extraction device; reference numeral 1210 denotes a position information group; reference numeral 1211 denotes a movement vector information; reference numeral 1212 denotes a likelihood information; reference numeral 1215 denotes a vector image data; and reference numeral 1217 denotes a pixel crossing determination result data. The pixel value extraction device 1206 is added to the basic configuration explained by FIG. 1. According to the mobile positioning apparatus configured as shown in FIG. 2, an image containing a pixel value required by the pixel crossing determination device 1204 is extracted from the vector image database 1205. The pixel value extraction device 1206 extracts the pixel value of the corresponding position and performs a pixel crossing determination required by the mobile positioning apparatus.

Figure 3:
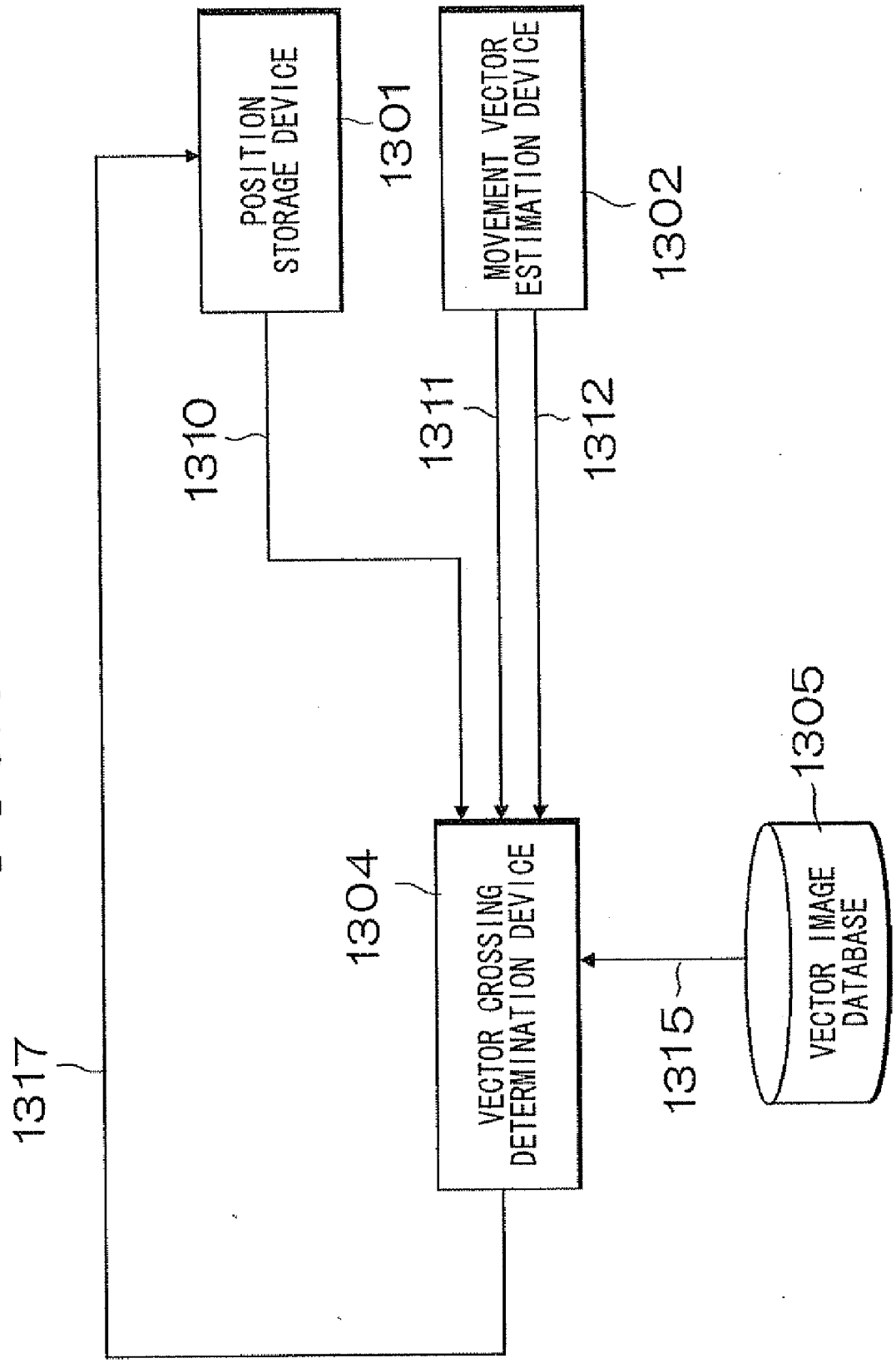
FIG. 3 is a block diagram explaining another configuration of the mobile positioning apparatus in a case where an image database uses vector data such as scalable vector graphics (SVG)

FIG. 3 is a block diagram explaining another configuration of the mobile positioning apparatus in a case where an image database uses vector data such as scalable vector graphics (SVG). With reference to FIG. 3, reference numeral 1301 denotes a position storage device; reference numeral 1302 denotes a movement vector estimation device; reference numeral 1304 denotes a vector crossing determination device; reference numeral 1305 denotes a vector image database; reference numeral 1310 denotes a position information group; reference numeral 1311 denotes a movement vector information; reference numeral 1312 denotes a likelihood information; reference numeral 1315 denotes a vector data of image data; and reference numeral 1317 denotes a vector crossing determination result data. The configuration of the mobile positioning apparatus shown in FIG. 3 illustrates an embodiment which excludes the pixel value extraction device 1206 which is required by the mobile positioning apparatus shown in FIG. 2. In other words, the pixel value extraction device 1206 is removed from the basic configuration shown in FIG. 2, and the pixel crossing determination device 1204 is replaced with the vector crossing determination device 1304.

The vector crossing determination device 1304 performs a determination on an inputted movement vector information 1311 to see whether or not there is crossing vector data 1315. According to the present embodiment, the crossing determination is performed not by converting the vector data 1315 to a pixel value, but by using vector image data as is. The vector data 1315 is expressed by numerically expressed data indicating a straight line and a curved line. Data processing by operation of crossing determination by a mathematical expression is performed for crossing determination.

Figure 4:
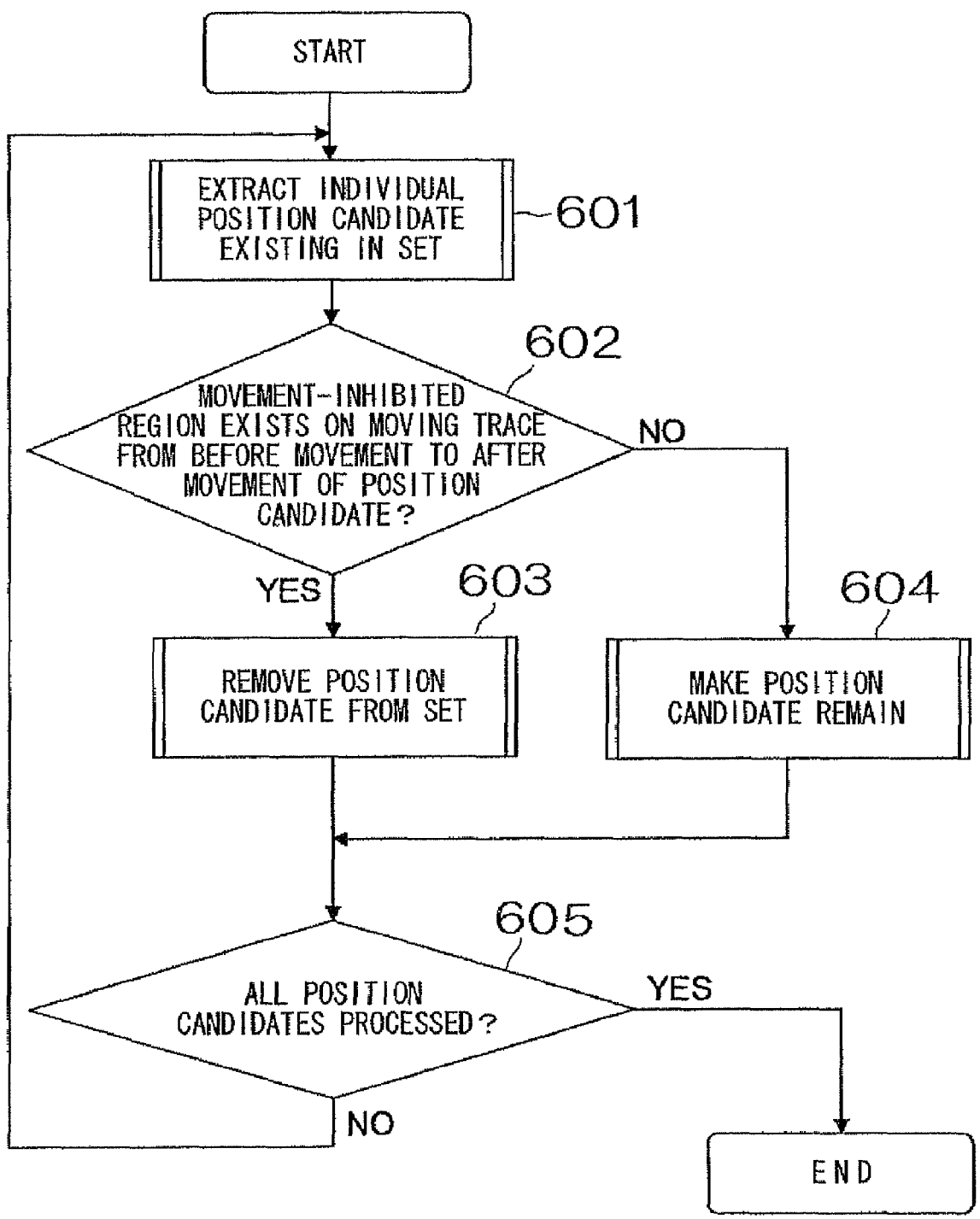
FIG. 4 is a flowchart for filtering a position candidate group by a crossing determination of map matching.

A flowchart of crossing determination is shown in FIG. 4. FIG. 4 is a flowchart for filtering a position candidate group by cross determination of map matching. The outline of this processing will be described. When the processing starts, first, each position candidate existing in a set of the position candidate group is extracted (step 601). A determination is made to see whether or not a movement-inhibited region (black area) exists on the moving trace from before movement to after movement of the position candidate (step 602). If there is a movement-inhibited region, the position candidate is removed from the set (step 603). If there is no movement-inhibited region, the position candidate remains in the set (steps 601, 602 and 604). The above processing is performed on all the position candidates and is repeated until all the position candidates are processed (step 605).

Figure 5:
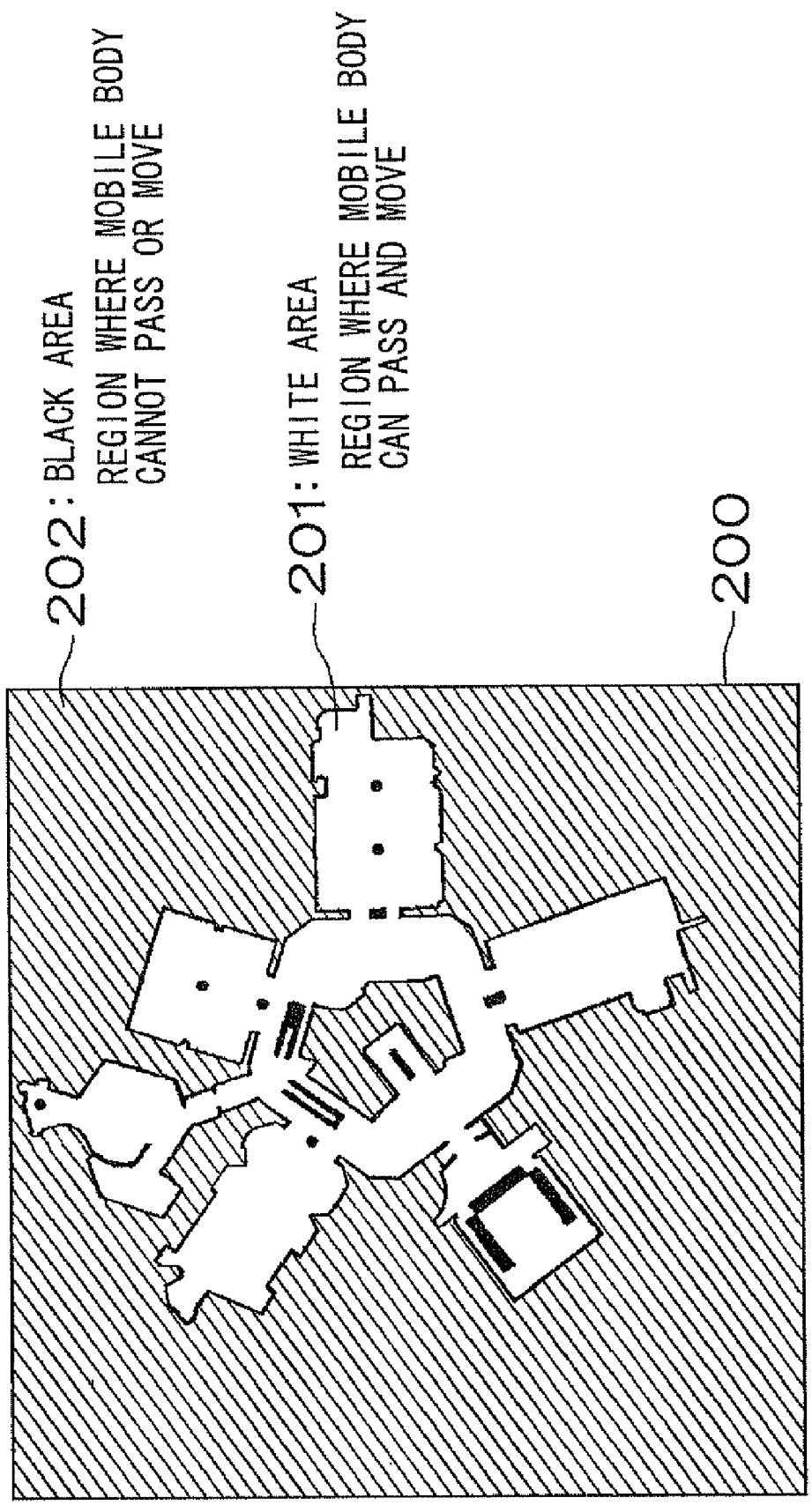
FIG. 5 is an example of a pixel image used for map matching.

According to an aspect of the present invention, when crossing occurs in a region inhibiting movement and passage by the pixel crossing determination, the position candidate is completely removed; while according to another aspect of the present invention, data processing is performed so as to adjust the degree of lowering the likelihood of the position candidate depending on the degree of the difficulty for the crossing pixel to move or pass through. After the above processing is completed, normalization is performed on the remaining candidate group and the pixel crossing determination result data 117 is outputted. FIG. 5 is an example of the image data 115 of a pixel image used for such processing. As shown in FIG. 5, the image data 115 contains a pixel image 200 in which a black area 202 indicates a region where a mobile body cannot pass through or move; and a white area 201 indicates a region where a mobile body can pass through and move. The pixel image 200 is used for map matching to determine whether or not there is a mobile candidate group in these regions.

Figure 6:
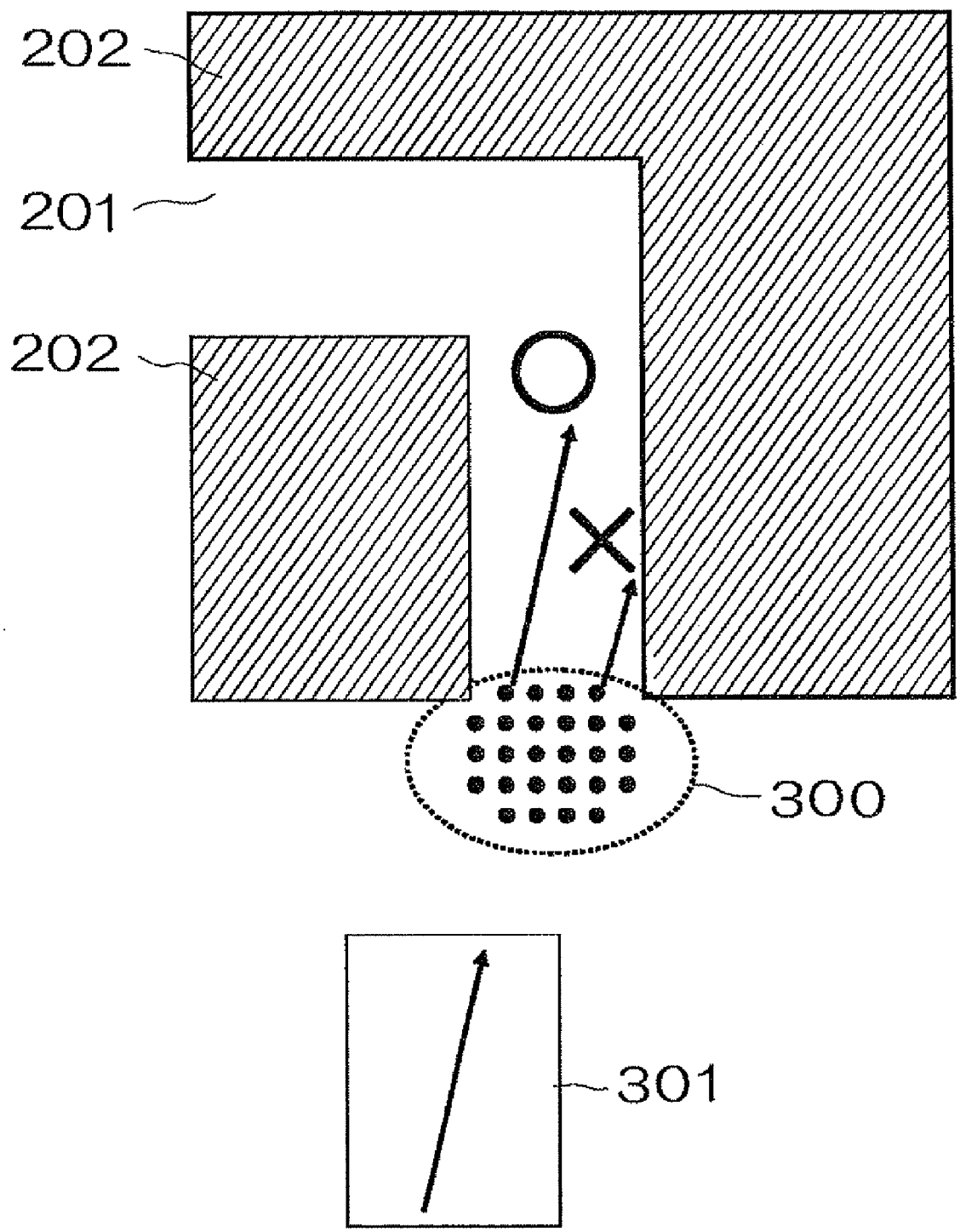
FIG. 6 is a drawing explaining how the position candidate group is filtered by map matching based on a pixel image.

FIG. 6 is a drawing explaining the filtering of the position candidate group by map matching based on a pixel image. According to the example of the FIG. 6, data where a likelihood is assigned to each point discretely arranged in a grid shape is used as the position information group 300 of a nonparametric distribution indicating the current position. A crossing determination is performed based on the movement vector 301 outputted by the movement vector estimation device to determine whether the position information group 300 of this distribution crosses the movable region 201 of the pixel image or the passage-inhibited region 202 thereof. As a result, the position information group 300 is updated. FIG. 6 illustrates an example of this. In this example, when a determination is made on the mobile candidate group based on the movement vector 301, the position candidates thereof in the first to second columns from the right are determined to be in (enter) the movement-inhibited region, and thus the position candidates are removed from the set.

Figure 7:
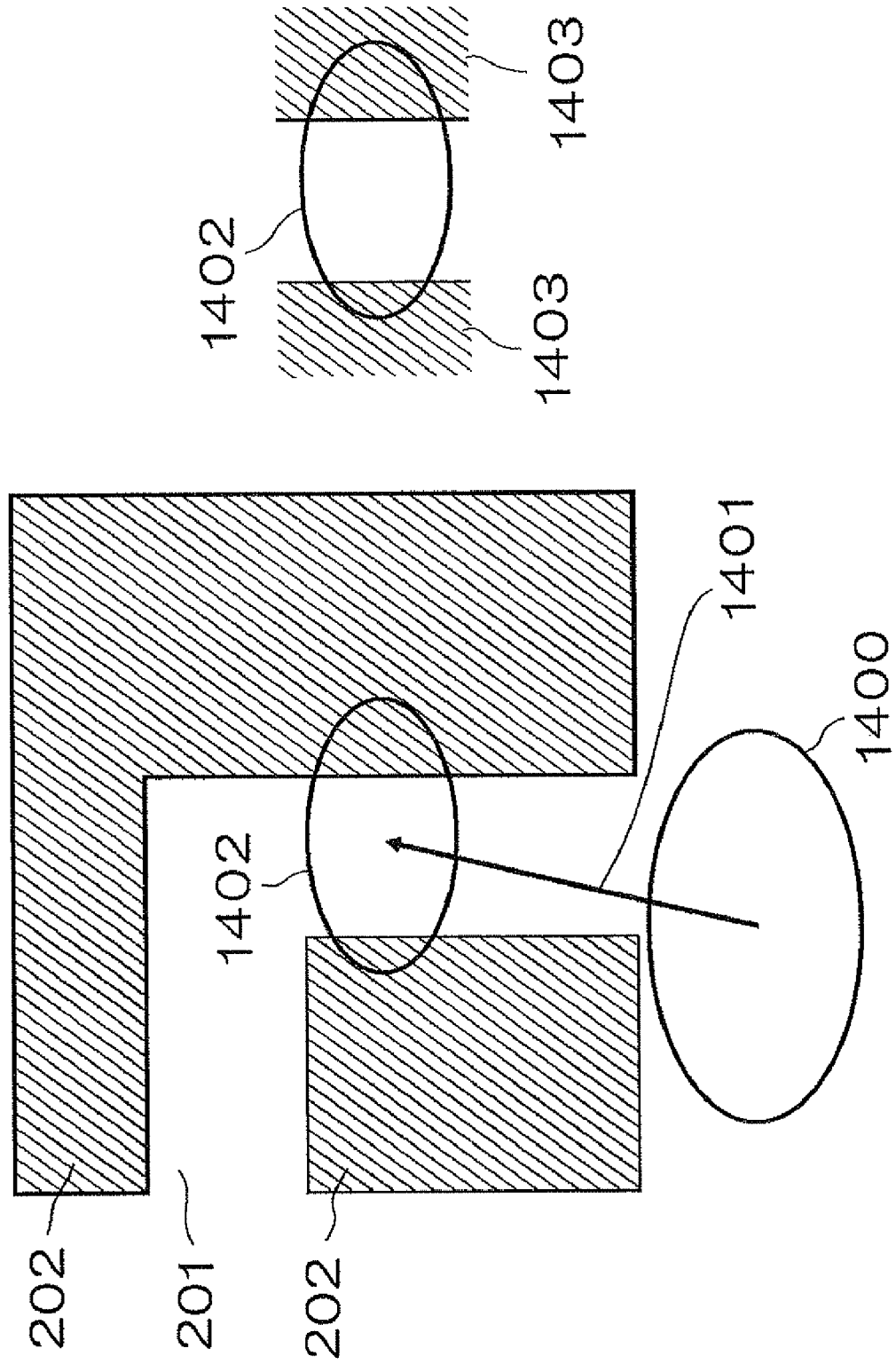
FIG. 7 is a drawing explaining an example of processing when a position of a mobile body is expressed by a parametric distribution.

FIG. 7 is a drawing explaining an example of processing when a position of a mobile body is expressed by a parametric distribution. Here, in this processing example to which description will be given, a crossing determination is made using the distribution 1400 before movement and the estimated movement vector 1401 to determine whether to cross the movable region 201 of the pixel image or the passage-inhibited region 202 thereof. As a result, a new distribution 1402 is generated. The newly generated distribution 1402 contains a region having the 0 height of the distribution. This region is expressed as a mask region 1403. The distribution 1402 after movement is expressed by combining the Gaussian mixture distribution.

Now, consideration is given to a case where the mobile positioning apparatus in accordance with the present invention is used in an environment having an automatically moving mechanism such as a moving walkway, an escalator, or an elevator. The information about the presence or absence of a device having an automatically moving mechanism such as a moving walkway or an escalator, and the moving speed and the moving direction thereof is stored in a region of the pixel image of a map stored in the image database. The movement vector is corrected and then the mobile candidate group is determined.

Figure 8:
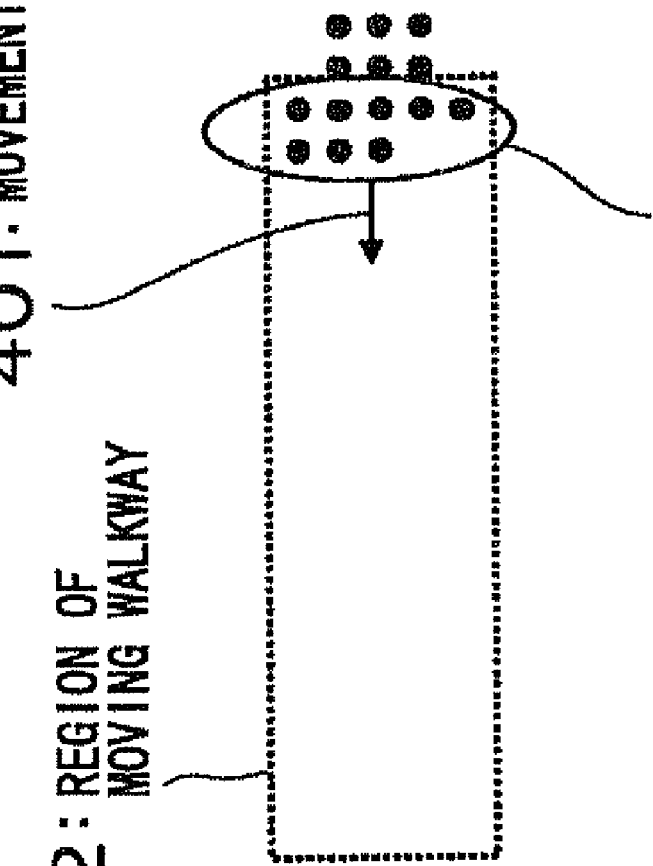
FIG. 8 is a drawing explaining a determination of a mobile candidate group in an environment having an automatically moving mechanism such as a moving walkway and an escalator.

FIG. 8 is a drawing explaining a determination of a mobile candidate group in an environment having an automatically moving mechanism such as a moving walkway and an escalator. In this case, the information about the presence or absence of a device having an automatically moving mechanism such as a moving walkway or an escalator in a region of the pixel image indicating a map, and the moving speed and the moving direction thereof is stored in the pixel image of the map of the image database. Therefore, the position candidate group generated in the pixel crossing determination device 104 is appropriately corrected to the right movement vector by adding and generating the movement vector moved by the automatically moving mechanism based on the position information group 110 of a nonparametric distribution outputted by the position storage device 101, the movement vector information 111 outputted by the movement vector estimation device 102 and the likelihood information 112.

As shown in FIG. 8, the information of the region 402 of the moving walkway and movement vector 401 of the moving walkway is added to the pixel image of the map stored in the image database. On the basis of these pieces of information, the position of the candidate group 400 on the moving walkway region is automatically moved and updated based on information from the image database. In the case of the configuration of FIG. 1, the information about the moving speed and the moving direction of a device having an automatically moving function between floors or within a floor in a region corresponding to the device having an automatically moving function between floors or within a floor is added to the pixel image of the map stored in the image database 105. According to the pixel crossing determination device 104 for determining the position candidate group, when there is a position candidate group 400 in the region 402 containing a device having a moving function such as a moving walkway, the position candidate group is generated by moving the position thereof based on the moving speed and the moving direction of the movement vector 401 of the moving walkway.

Figure 9:
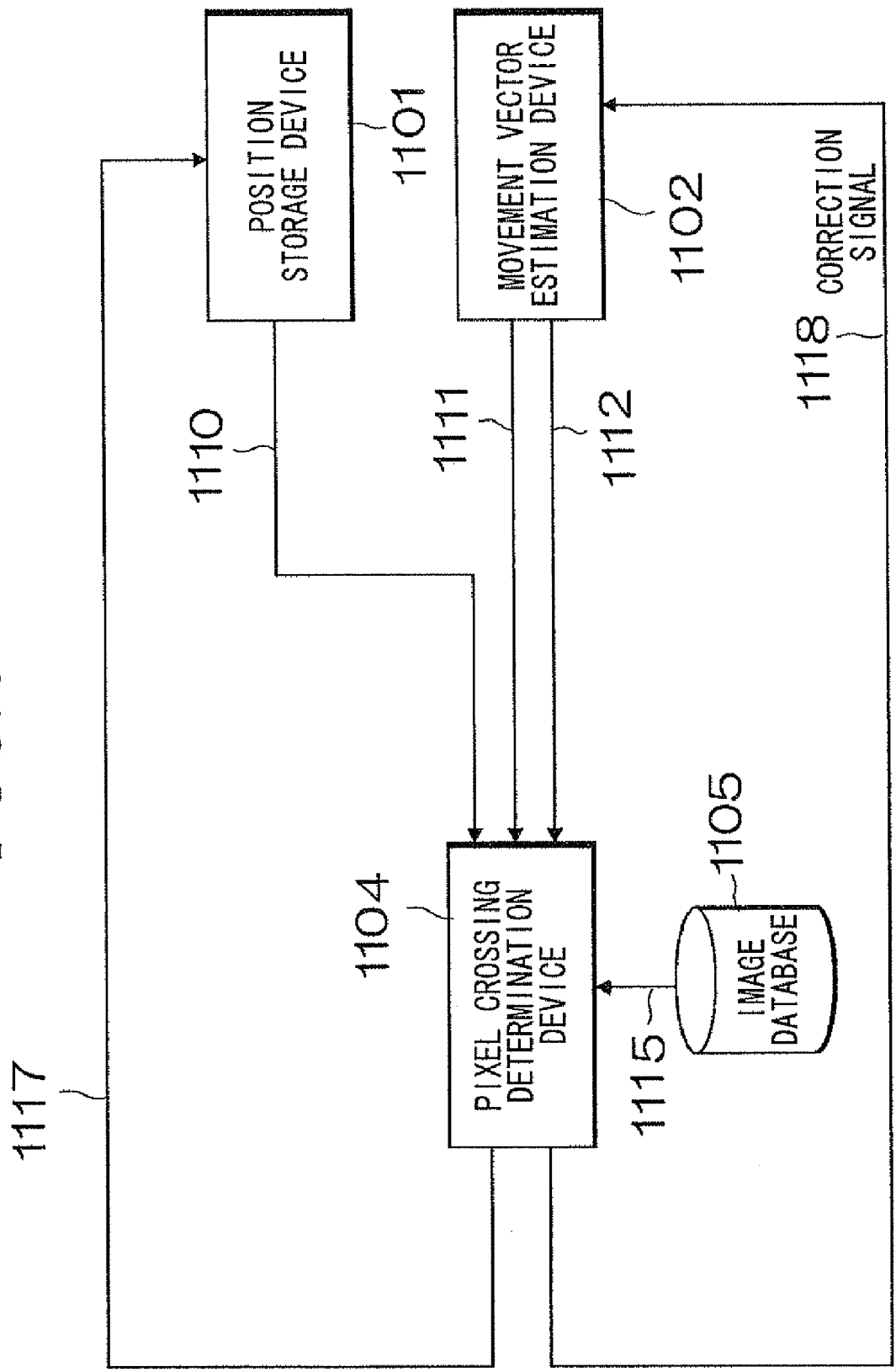
FIG. 9 is a drawing explaining a configuration of a mobile positioning apparatus having a function to correct a movement vector error.

Correction of the movement vector may be configured to be performed based on the processing result of the pixel crossing determination device 104. FIG. 9 is a drawing explaining a configuration of the mobile positioning apparatus having a function to correct a movement vector error. According to the system configuration shown in FIG. 9, as shown in the diagram, a correction signal 1118 is configured to be supplied from the pixel crossing determination device 1104 to the movement vector estimation device 1102. During the process where the pixel crossing determination device 1104 performs a crossing determination on each candidate in the position candidate group to see whether to cross a pixel inhibiting movement and passage, if the majority of candidates crosses the pixel inhibiting movement and passage, the crossing angle is considered to be an estimated error of the movement vector estimation device 1102 and an error correction signal 1118 is outputted.

Figure 10:
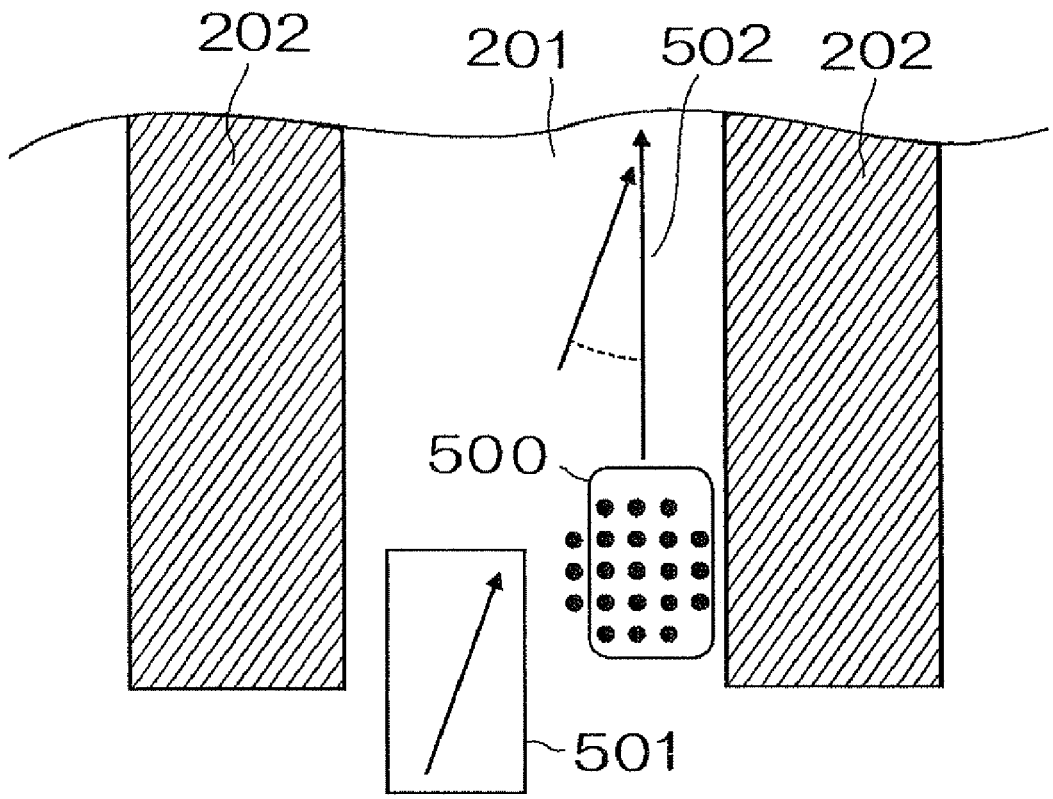
FIG. 10 is a drawing explaining an example of how to calculate a movement vector error by a pixel crossing determination device.

FIG. 10 is a drawing explaining an example of calculating a movement vector error by a pixel crossing determination device. As shown in FIG. 10, when position information group 500 is moved based on the movement vector 501 outputted by the movement vector estimation device 1102, the pixel crossing determination device 1104 determines the position candidate group removed by the region crossing determination. If the majority of the candidate group is removed, the angle between the straight line direction 502 and the movement vector 501 is fed back as an error of the moving direction of the movement vector estimation device (dead reckoning device) 1102.

The combination of the mobile positioning apparatus in accordance with the present invention with a mobile dead reckoning device is one of the most effective embodiments. Since the dead reckoning device is expected to have a function to output a movement vector of the mobile body, the dead reckoning device can be used as the movement vector estimation device as is. Dead reckoning devices often implement the internal state updating as a Kalman filter. In that case, the movement vector and the likelihood information thereof can be parametrically outputted.

In general, the dead reckoning device has a function to reflect the observation result in an internal estimation result by obtaining observation means from outside. For example, a car navigation system has a dead reckoning device using a car speed pulse output and a wheel direction output (or a gyro sensor output) and also has means for obtaining an observation from a GPS (global positioning system).

Figure 11:
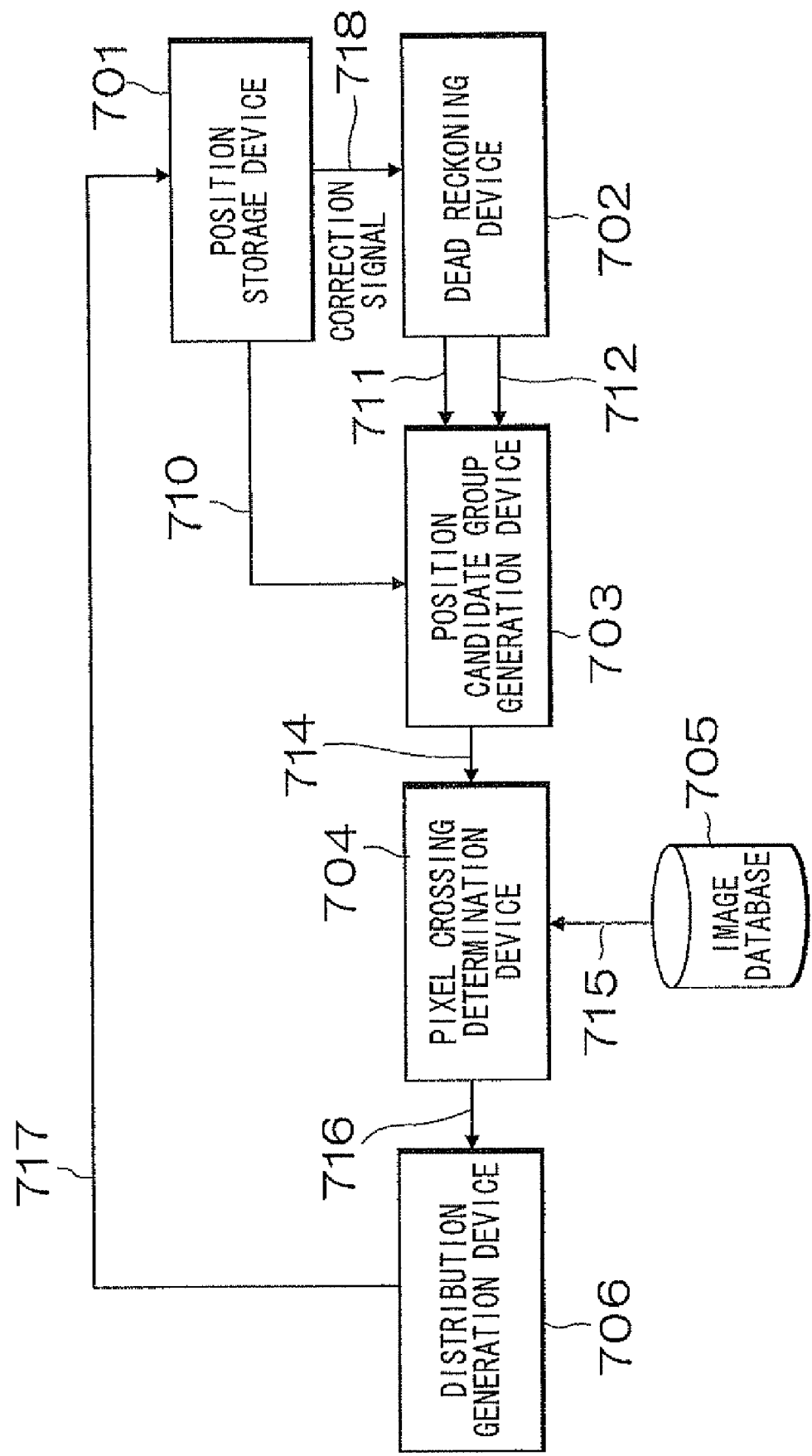
FIG. 11 is a diagram showing an example of a system in accordance with an embodiment implemented by combining the mobile positioning apparatus with a dead reckoning device.

The accumulated error of the dead reckoning device can be reduced by reflecting a correction result of the current position by map matching in such a system. FIG. 11 is a diagram showing an example of a system in accordance with an embodiment implemented by combining the mobile positioning apparatus with a dead reckoning device, and illustrates an example of a system in accordance with the embodiment in a diagram. With reference to FIG. 11, the position storage device 701 holds the information about the current position as a position candidate group showing a nonparametric distribution and passes the information as the output 710 to the position candidate group generation device 703. The dead reckoning device 702 outputs the movement vector 711 at discrete time T and the likelihood information 712 and passes the information to the position candidate group generation device 703.

Here, as the movement vector 711 and the likelihood information 712, for example, an observation result and an error variance-covariance matrix obtained by sensing means (a gyro sensor or an acceleration sensor) installed in the dead reckoning device 702 can be used. Since the dead reckoning device is implemented by an update loop of a Kalman filter, such a form of data can be obtained.

The position candidate group generation device 703 generates and outputs the candidate group of positions (set of position candidate groups) 714 at the next discrete time T+1 from the output 710 of a nonparametric distribution of the current position from the position storage device 701, the movement vector 711, and the likelihood information 712 thereof.

The set of candidate group of positions 714 has four pieces of information about position candidates: a position before movement, a position after movement, the moving trace thereof (e.g., a straight line connecting between the point before movement and the point after movement), and a likelihood of the position after movement. The pixel crossing determination device 704 receives a position candidate group outputted by the position candidate group generation device 703 as an input. As described in the description referring to FIG. 1, the pixel crossing determination device 704 extracts image data 715 from the pixel image group stored in the image database 705, performs map matching based on the value of a pixel existing on the moving trace of each candidate, determines the likelihood at the next time, updates the position candidate group, and outputs the updated position candidate group 716. The distribution generation device 706 receives the position candidate group 716 as an input, and generates and outputs the position information group 717 of a nonparametric distribution of the data structure (data format) held by the position storage device 701. The position storage device 701 receives the position information group 717 of a nonparametric distribution as an input, updates the held content, and at the same time, inputs the information into the dead reckoning device 702 as the correction signal 718.

Figure 12:
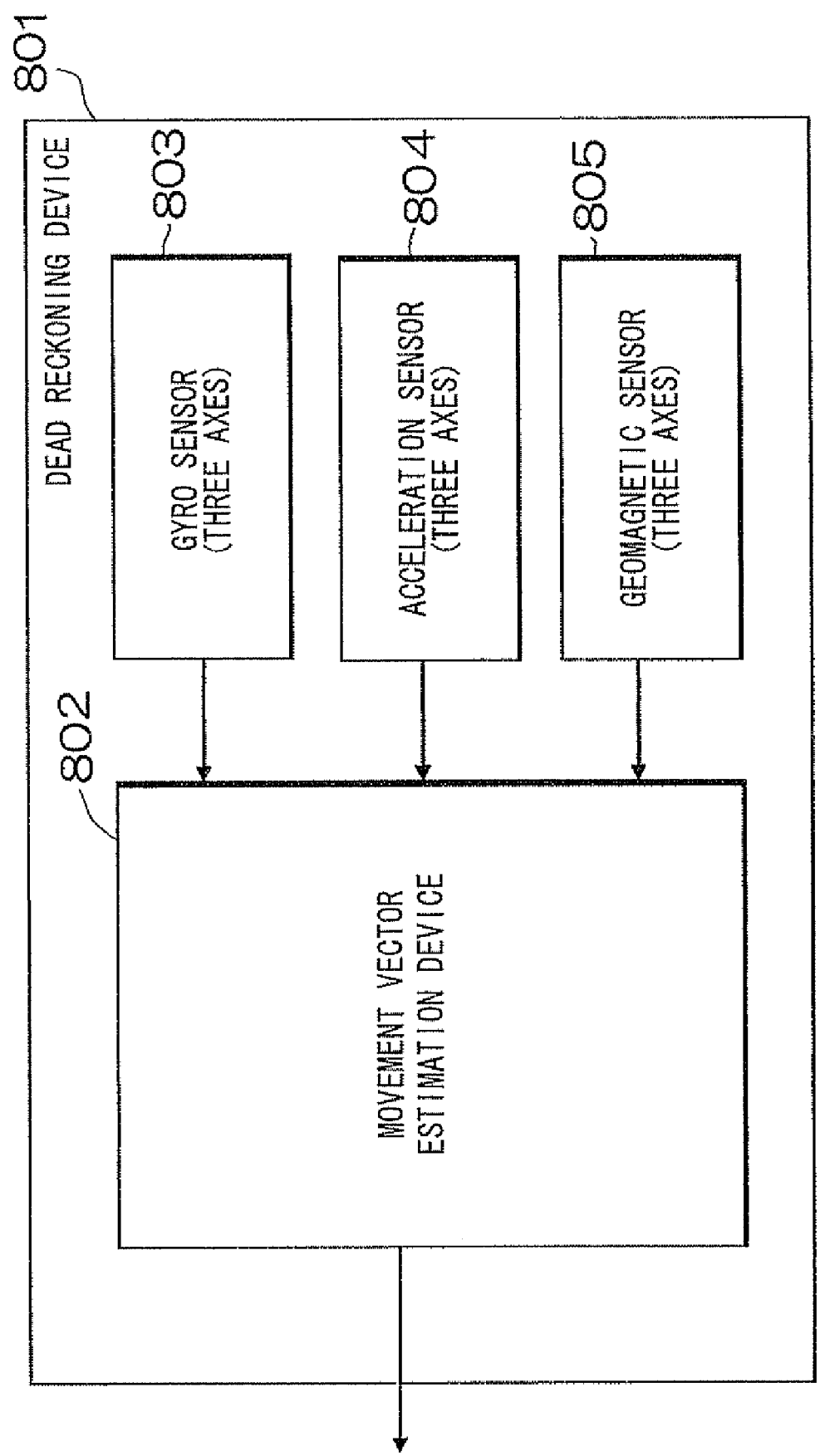
FIG. 12 is block diagram illustrating a configuration of the dead reckoning device.

FIG. 12 is a block diagram illustrating a configuration of the dead reckoning device. As shown in FIG. 12, the dead reckoning device 801 includes a gyro sensor (three axes) 803, an acceleration sensor (three axes) 804, a geomagnetic sensor (three axes) 805, and a movement vector estimation device 802 for calculating the movement vector from the sensor data. When combined with a dead reckoning device, the system is configured with a sensor which can be miniaturized (a gyro sensor, an acceleration sensor, and a geomagnetic sensor) so as to be worn by a human.

When the movement vector estimation device of the mobile positioning apparatus in accordance with the present invention is assumed to be worn by a human, it is possible to use a dead reckoning device configured by a combination of a gyro sensor, a geomagnetic sensor, and an acceleration sensor to build a compact implementation system. For example, it is possible to implement a device which analyzes a human walking action by a combination of a gyro sensor, a geomagnetic sensor, and an acceleration sensor, and estimates the movement vector thereof (see Non-Patent Document 4).

Figure 13:
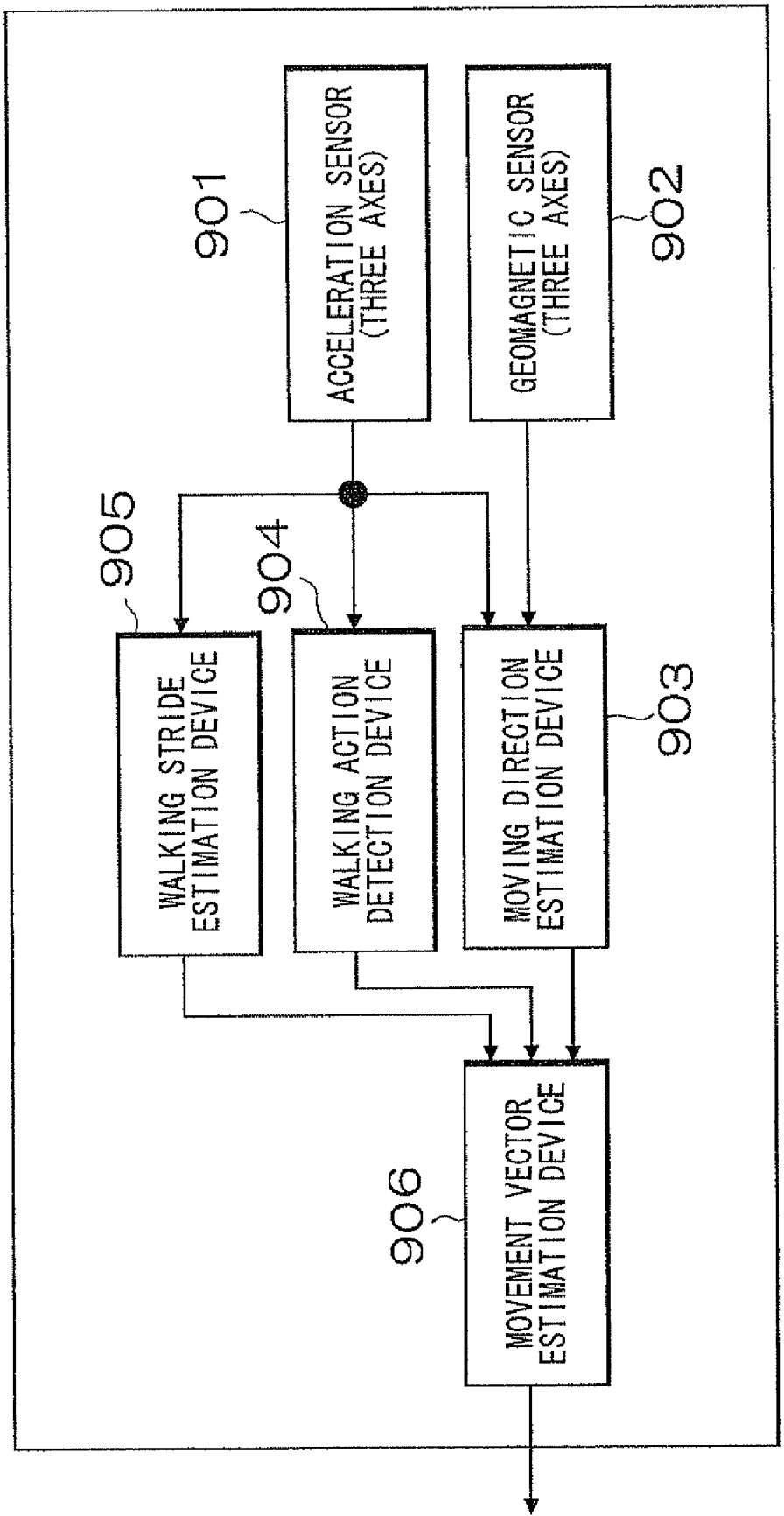
FIG. 13 is a block diagram illustrating a configuration of the dead reckoning device worn by a human.

FIG. 13 is a block diagram illustrating a configuration of the dead reckoning device worn by a human. Illustrated is an example of a system configuration where a movement vector estimation device 906 is implemented by using an acceleration sensor 901 and a geomagnetic sensor 902 as sensing means. The movement vector estimation device 906 is built by a combination of the walking stride estimation device 905, the moving direction estimation device 903, and the walking action detection device 904.

Figure 14:
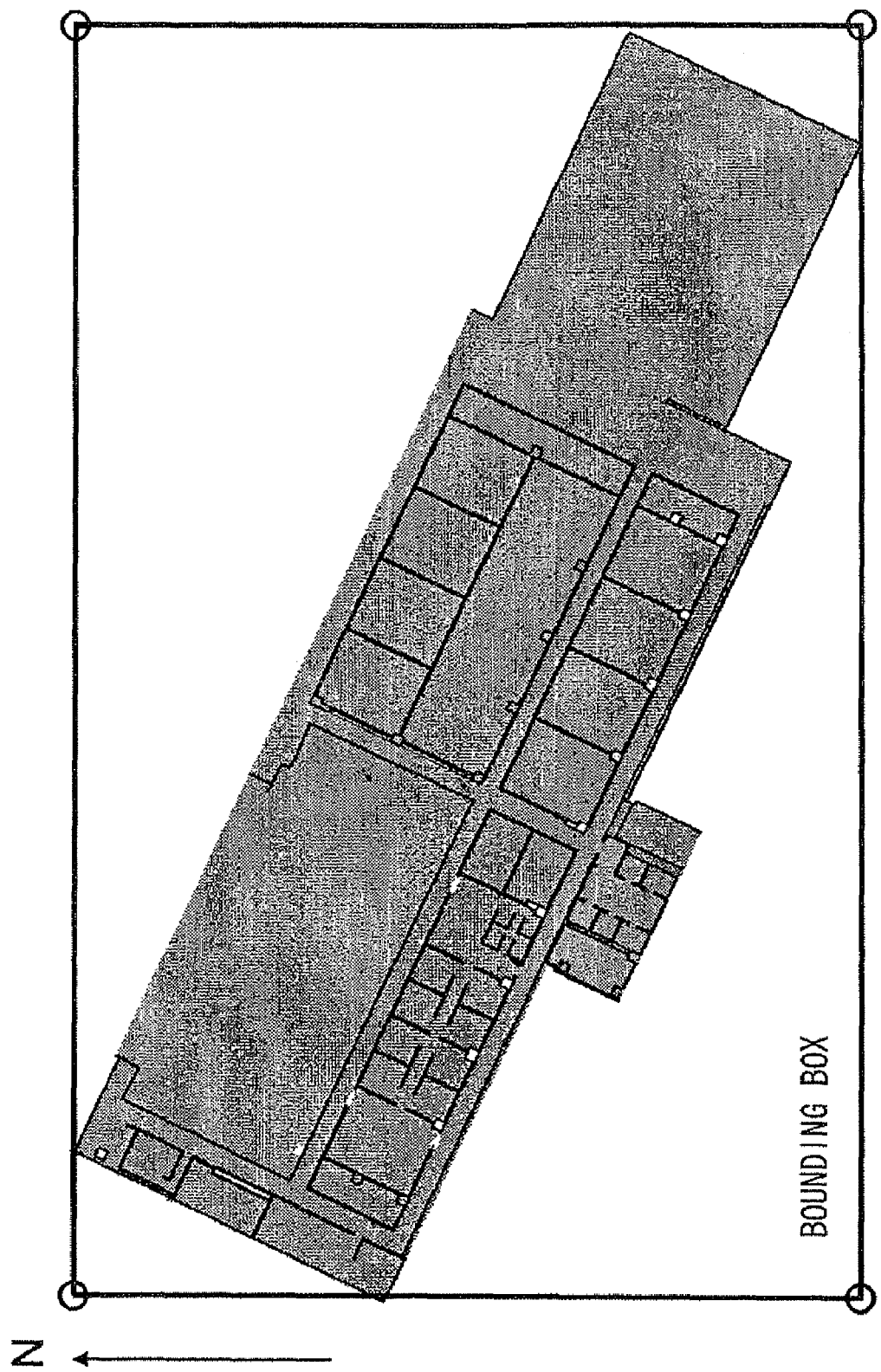
FIG. 14 is a drawing illustrating an example of a bounding box for surrounding a parallel projected three-dimensional model by aligning a latitude/longitude coordinate system.

FIG. 14 is a drawing illustrating an example of a bounding box for surrounding a parallel projected three-dimensional model by aligning a latitude/longitude coordinate system. According to the mobile positioning apparatus of the present invention, the pixel image used for map matching can be generated from an existing three-dimensional model data. In this case, for example, when software such as Google SketchUp is used as three-dimensional model data, the model can be easily built. When the model is put and arranged in software such as Google Earth, position information can be assigned thereto. When the three-dimensional model having the position information is parallel projected in a direction perpendicular to the ground from above, a different pixel value is assigned to a region which a human cannot move or pass and to the other regions. When the parallel projected image is aligned to the latitude/longitude so as to be the smallest size, and a bounding box is generated, the four corners thereof match the coordinate of the image. FIG. 14 shows an example of a bounding box and an image obtained by parallel projecting the three-dimensional model.

Here, a pixel image is generated as data of a guide map based on a three-dimensional model data where ease of movement and passage and the position and the direction thereof are stored as an attribute in a region of the image. When the three-dimensional model is parallel projected in a direction perpendicular to the ground from above, a bounding box aligned to the coordinate expressing the position and the direction thereof is generated.

Here, the generated bounding box contains the smallest size of the three-dimensional model on a projected plane. The vertex position information for this bounding box is utilized as the position information of the generated pixel image. Then, the three-dimensional model is parallel projected and the pixel image is generated so as to reflect the attributes of ease of movement and passage in the pixel values at projection. The generated pixel image is stored in the image database as the pixel image used for map matching.

It should be noted that for the three-dimensional model, density (N %) where an object is stuffed in the height direction from the floor is calculated for one floor. The pixel value representing the ease of movement and passage can be calculated according to the density. For example, for an 8 bit gray scale image, pixel value can be calculated by the expression: pixel value=255*(100−N)/100.

What is claimed is:
1. A mobile positioning apparatus comprising:
   a position storage device which holds a position information group indicating a current position of a mobile body and likelihood information thereof as a nonparametric distribution;
   a movement vector estimation device which outputs a movement vector indicating a moving distance and a moving direction of the mobile body at a discrete time T and likelihood information thereof;

an image database which holds a peripheral map of a range of movement of the mobile body as an image group of a resolution according to a moving resolution of the mobile body; and a pixel crossing determination device which performs map matching using the position information group and the movement vector based on the peripheral map;

wherein the image database accumulates the peripheral map as a pixel image group which has a different pixel value depending on a region where the mobile body can move and the other regions and which has a known correspondence to position information; and the pixel crossing determination device generates a position candidate group at a discrete time T+1 based on the position information group at a discrete time T held by the position storage device, the movement vector outputted by the movement vector estimation device, and likelihood information of the movement vector;

performs a pixel crossing determination on each position candidate taken from the position candidate group to determine whether a moving path connecting between a point before movement and a point after movement thereof crosses a pixel inhibiting movement and passage on an image;

filters the generated position candidate group and generates the remaining position candidate group;

normalizes the result, generates the position information group of a nonparametric distribution of a position at a discrete time T+1, and updates a content of the position storage device.

2. The mobile positioning apparatus according to claim 1, wherein
the position information group held by the position storage device is position information indicating the current position of the mobile body and likelihood information thereof as a nonparametric distribution.

3. The mobile positioning apparatus according to claim 1, wherein
the position candidate group has discrete position information and likelihood information thereof.

4. The mobile positioning apparatus according to claim 1, wherein
a pixel image of the pixel image group accumulated in the image database has a different size of pixel value corresponding to the position depending on ease of movement and passage in a region inside the image; and
the pixel crossing determination device calculates the crossing determination result according to the size of the pixel value on the moving path and reduces the likelihood of each position candidate group based on the degree of crossing and the size of the pixel value.

5. The mobile positioning apparatus according to claim 1, wherein
information about a moving speed and a moving direction of a device having an automatically moving function between floors or within a floor is assigned to a region of the map accumulated in the image database corresponding to the device having the automatically moving function between floors or within a floor; and
when there is a position candidate group in the region containing the device having the moving function, the pixel crossing determination device generates the position information group by moving the position thereof by the moving speed and the moving direction thereof.

6. The mobile positioning apparatus according to claim 1, wherein
information about an adjacent state on a plane is assigned to a pixel image in the pixel image group accumulated in the image database; and
when a movement vector crossing between the accumulated pixel images is inputted by estimation, the pixel crossing determination device obtains pixel data required for crossing determination with respect to the movement vector by selecting from the image database a plurality of pixel image groups including all movable position candidate groups of the movement vector.

7. The mobile positioning apparatus according to claim 1, wherein
information about an adjacent state in a height direction of the position is assigned to a pixel image in the pixel image group accumulated in the image database; and
when a movement vector indicating a movement of the mobile body in a vertical direction is generated, the pixel crossing determination device obtains pixel data required for crossing determination with respect to the movement vector by selecting the pixel image groups connected vertically including all movable position candidate groups of the movement vector.

8. The mobile positioning apparatus according to claim 1, wherein
when the pixel crossing determination device performs crossing determination using the movement vector outputted by the movement vector estimation device and finds that there are many candidates crossing a passage-inhibited region continuing in a time series direction on the map showing a continuous straight line path,
the crossing determination uses the angle between the straight line path and a majority of movement vectors for error estimation of the moving direction outputted by the movement vector estimation device so as to correct the error outputted by the movement vector estimation device.

9. The mobile positioning apparatus according to claim 1, wherein
the movement vector estimation device comprises a walking action detection device, a walking stride estimation device, and a moving direction estimation device;
the walking action detection device outputs the presence or absence of walking action and the likelihood information thereof;
the walking stride estimation device outputs a walking stride and the likelihood information thereof;
the moving direction estimation device outputs a moving direction and the likelihood information thereof; and
the movement vector estimation device outputs the movement vector and the likelihood information thereof based on the presence or absence of walking action and the likelihood information thereof, the walking stride and the likelihood information thereof, and the moving direction and the likelihood information thereof.

10. A method for generating a pixel image used by the mobile positioning apparatus according to claim 1,
based on a three-dimensional model data where ease of movement and passage and the position and the direction thereof are stored as an attribute in a region inside the image, the method comprising:
generating a bounding box which is aligned to a coordinate system representing the position and the direction and which is of the smallest size on a plane where the three-dimensional model is projected when this three-dimensional model is parallel projected in a direction perpendicular to the ground from above;

obtaining the vertex position information of the bounding box as the position information of the generated pixel image;

parallel projecting the three-dimensional model and generating the pixel image so as to reflect the attributes of ease of movement and passage in the pixel values at projection; and storing the generated pixel image in the image database.

11. A mobile positioning apparatus, comprising:

a position storage device which holds a position information group indicating a current position of a mobile body and likelihood information thereof as a nonparametric distribution;

a movement vector estimation device which outputs a movement vector indicating a moving distance and a moving direction of the mobile body at a discrete time T and likelihood information thereof;

an image database which holds a peripheral map of a range of movement of the mobile body as a vector image group; and a vector crossing determination device which performs map matching using the position information group and the movement vector based on the peripheral map;

wherein the image database accumulates the peripheral map as a vector image group which has a different data value in a vector format depending on a region where the mobile body can move and the other regions and which has a known correspondence to position information; and the vector crossing determination device generates a position candidate group at a discrete time T+1 based on a position information group at a discrete time T held by the position storage device, the movement vector outputted by the movement vector estimation device, and likelihood information of the movement vector;

performs a region crossing determination on each position candidate taken from the position candidate group to determine whether a moving path connecting between a point before movement and a point after movement thereof crosses a region inhibiting movement and passage on a vector image;

filters the generated position candidate group and generates the remaining position candidate group;

normalizes the result, generates the position information group of a nonparametric distribution of a position at a discrete time T+1, and updates a content of the position storage device.

12. The mobile positioning apparatus according to claim 11, wherein the position information group held by the position storage device is position information indicating the current position of the mobile body and likelihood information thereof as a nonparametric distribution.

13. The mobile positioning apparatus according to claim 11, wherein the position candidate group has discrete position information and likelihood information thereof.

14. The mobile positioning apparatus according to claim 11, wherein information about a moving speed and a moving direction of a device having an automatically moving function between floors or within a floor is assigned to a region of the map accumulated in the image database corresponding to the device having the automatically moving function between floors or within a floor; and when there is a position candidate group in the region containing the device having the moving function, the vector crossing determination device generates the position information group by moving the position thereof by the moving speed and the moving direction thereof.

15. The mobile positioning apparatus according to claim 11, wherein when the vector crossing determination device performs crossing determination using the movement vector outputted by the movement vector estimation device and finds that there are many candidates crossing a passage-inhibited region continuing in a time series direction on the map showing a continuous straight line path, the crossing determination uses the angle between the straight line path and a majority of movement vectors for error estimation of the moving direction outputted by the movement vector estimation device so as to correct the error outputted by the movement vector estimation device.

16. The mobile positioning apparatus according to claim 11, wherein the movement vector estimation device comprises a walking action detection device, a walking stride estimation device, and a moving direction estimation device;

the walking action detection device outputs the presence or absence of walking action and the likelihood information thereof;

the walking stride estimation device outputs a walking stride and the likelihood information thereof;

the moving direction estimation device outputs a moving direction and the likelihood information thereof; and the movement vector estimation device outputs a movement vector and the likelihood information thereof based on the presence or absence of walking action and the likelihood information thereof, the walking stride and the likelihood information thereof, and the moving direction and the likelihood information thereof.

* * * * *